(12) United States Patent
Strait et al.

(10) Patent No.: US 11,221,795 B2
(45) Date of Patent: Jan. 11, 2022

(54) QUEUE MANAGEMENT FOR MULTIWAY QUEUES

(71) Applicant: INTERNATIONAL BUSINESS MACHINES CORPORATION, Armonk, NY (US)

(72) Inventors: Gary E. Strait, Poughkeepsie, NY (US); Matthias Klein, Poughkeepsie, NY (US); Alia Shah, Poughkeepsie, NY (US); Sajay Mathew Karottukottarathil Baby, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/284,412

(22) Filed: Feb. 25, 2019

(65) Prior Publication Data
US 2020/0272357 A1 Aug. 27, 2020

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 4,785,394 A | 11/1988 | Fischer | |
| 4,817,037 A | 3/1989 | Hoffman et al. | |
| 4,953,081 A | 8/1990 | Feal et al. | |
| 5,416,910 A | 5/1995 | Moyer et al. | |
| 5,519,701 A | 5/1996 | Colmant et al. | |
| 5,748,969 A | 5/1998 | Lee et al. | |
| 5,901,295 A | 5/1999 | Yazdy | |
| 5,903,776 A * | 5/1999 | Larson | G06F 13/4027 710/54 |
| 6,092,158 A * | 7/2000 | Harriman | G06F 13/1642 710/240 |
| 6,629,220 B1 | 9/2003 | Dyer | |
| 6,694,417 B1 | 2/2004 | Liao et al. | |
| 7,366,854 B2 | 4/2008 | Wastlick et al. | |
| 7,650,385 B2 | 1/2010 | Chen et al. | |
| 9,274,836 B2 | 3/2016 | Hildrum et al. | |
| 10,078,882 B2 | 9/2018 | Rogers et al. | |

(Continued)

*Primary Examiner* — Gary W. Cygiel
(74) *Attorney, Agent, or Firm* — Cantor Colburn LLP; Margaret McNamara

(57) ABSTRACT

Methods, systems, and computer program products for queue management are provided. Aspects include receiving a first queue entry and storing the first queue entry in a queue at a first location, wherein the first queue entry includes a first target destination, receiving a second queue entry and storing the second queue entry in the queue at a second location, wherein the second queue entry includes a second target destination, tracking a relative age for each of the first queue entry and the second queue entry, transmitting the first queue entry to the first target destination based at least in part on the relative age for the first queue entry being greater than the relative age for the second queue entry, and receiving a third queue entry and storing the third queue entry in the queue at the first location.

16 Claims, 12 Drawing Sheets

(56) References Cited

U.S. PATENT DOCUMENTS

| | | | |
|---|---|---|---|
| 2003/0079068 A1* | 4/2003 | Barrick | G06F 9/546 710/52 |
| 2011/0320722 A1* | 12/2011 | Dunn Berger | G06F 12/084 711/125 |
| 2014/0095745 A1 | 4/2014 | Kawahara | |
| 2018/0225151 A1 | 8/2018 | Park | |

* cited by examiner

QUEUE MANAGEMENT FOR MULTIWAY QUEUES

BACKGROUND

The present invention generally relates to queue management, and more specifically, to queue management for multiway queues.

Typical computer systems utilize a system of queues for handling input/output (I/O) commands which can be read/write requests, commands, and the like. These queues often utilize a first in, first out (FIFO) algorithm for managing how these queue inputs are addressed. Often, queues can be sorted to go to a specific target destination or go to multiple target destinations. Tracking and managing a FIFO queue with multiple destinations can be challenging as additional hardware locations may be needed for shifting the queue or re-ordering queue entries so that target destinations are served fairly.

SUMMARY

Embodiments of the present invention are directed to a computer-implemented method for queue management. A non-limiting example of the computer-implemented method includes receiving a first queue entry and storing the first queue entry in a queue at a first location, wherein the first queue entry includes a first target destination, receiving a second queue entry and storing the second queue entry in the queue at a second location, wherein the second queue entry includes a second target destination, tracking a relative age for each of the first queue entry and the second queue entry, transmitting the first queue entry to the first target destination based at least in part on the relative age for the first queue entry being greater than the relative age for the second queue entry, and receiving a third queue entry and storing the third queue entry in the queue at the first location.

Embodiments of the present invention are directed to a computer program product for queue management comprising a computer readable storage medium having program instructions embodied therewith, the program instructions executable by a processor to cause the processor to perform a method. A non-limiting example of the method includes receiving a first queue entry and storing the first queue entry in a queue at a first location, wherein the first queue entry includes a first target destination, receiving a second queue entry and storing the second queue entry in the queue at a second location, wherein the second queue entry includes a second target destination, tracking a relative age for each of the first queue entry and the second queue entry, transmitting the first queue entry to the first target destination based at least in part on the relative age for the first queue entry being greater than the relative age for the second queue entry, and receiving a third queue entry and storing the third queue entry in the queue at the first location.

Embodiments of the present invention are directed to a system. A non-limiting example of the system includes a plurality of queues comprising a first queue, a second queue, a third queue, and a fourth queue, wherein each of the plurality of queues include two target destinations, the two target destinations comprising a first target destination and a second target destination, an arbitration circuit configured to track a relative age of queue entries in each of the plurality of queues, and identify a first set of queue entries comprising a first target destination queue entry from each of the plurality of queues, identify a second set of queue entries comprising a second target destination queue entry from each of the plurality of queues, and transmit each first target destination queue entry from the first set of queue entries to the first target destination in order of relative age.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
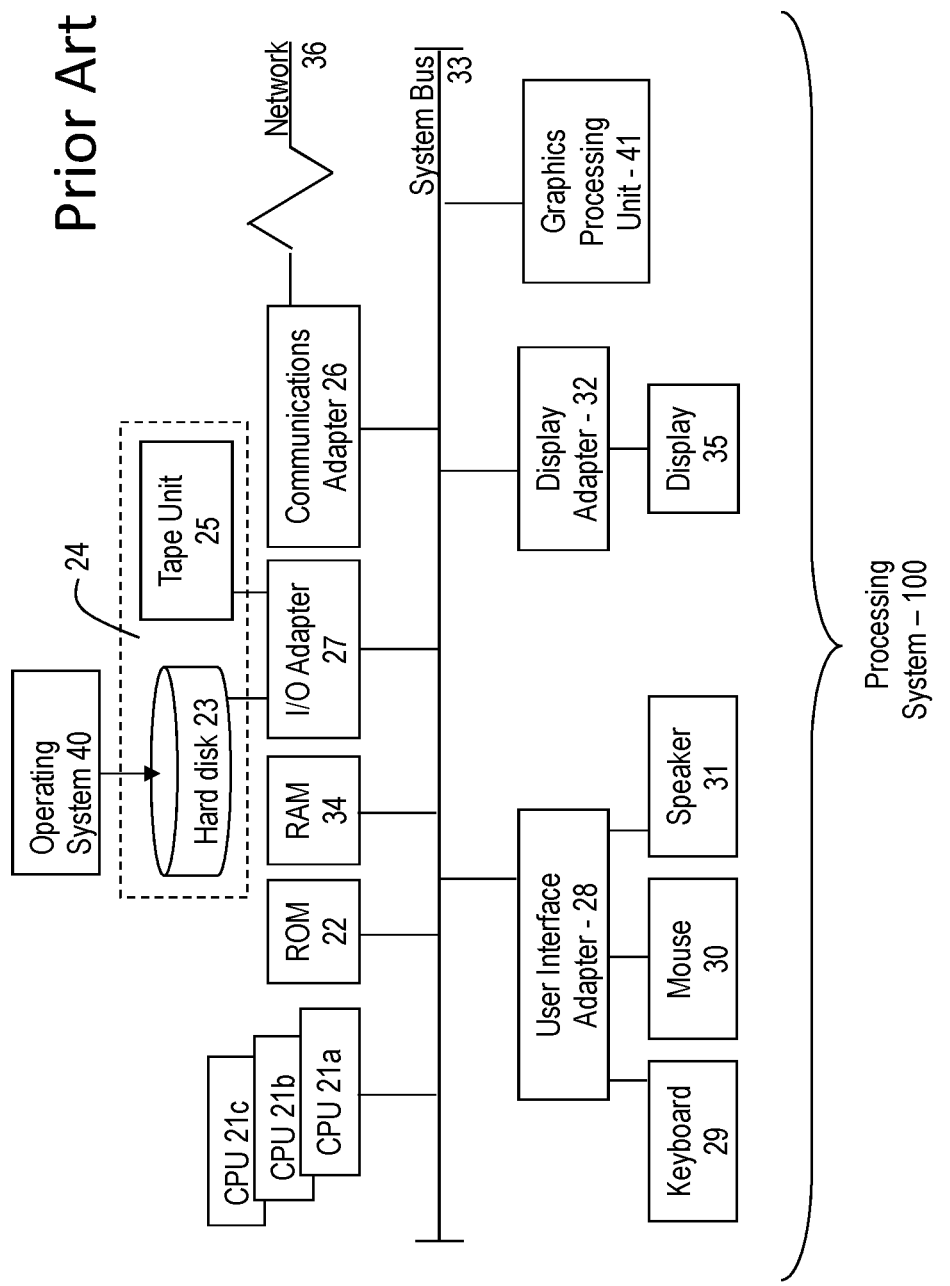
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via one or more system buses 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adaptor to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 1.

Turning now to an overview of technologies that are more specifically relevant to aspects of the invention, typical queues for input/output (I/O) transactions receive queue entries from a source and tracks the order which the entries are received. However, most queues do not track the destination of these queue entries and simply shift these queue entries out of the queue requiring a read/write operation. In hardware, each read/write operation consumes power, thus, a queue that shifts entries within a queue consumes additional power and requires logic paths for doing the shift (re-order) operation.

Turning now to an overview of the aspects of the invention, one or more embodiments of the invention address the above-described shortcomings of the prior art by providing efficient queues to receive bus transactions of different types from multiple sources destined for multiple receivers. An arbiter is utilized to forward queue entries to respective destinations as the destinations are ready to receive these queue entries while at the same time maintaining order within each transaction type and destination. The queue can utilize a storage array and not require shifting operations when a queue entry is read from the queue. Additionally, any new queue entry (after a queue entry is read) can be stored in the previous location of the read-out queue entry.

In one or more embodiments of the invention, one queue can be provided per source each with a set of credits to allow the sender to forward an agreed number of command transactions and an agreed number of data transactions to be held in queue. The transactions can be destined for multiple destinations, in any combination. In some embodiments, a queue can utilize a full least-recently-used (LRU) algorithm per sender queue to keep track of the relative age of each queue entry in the queue.

Figure 2:
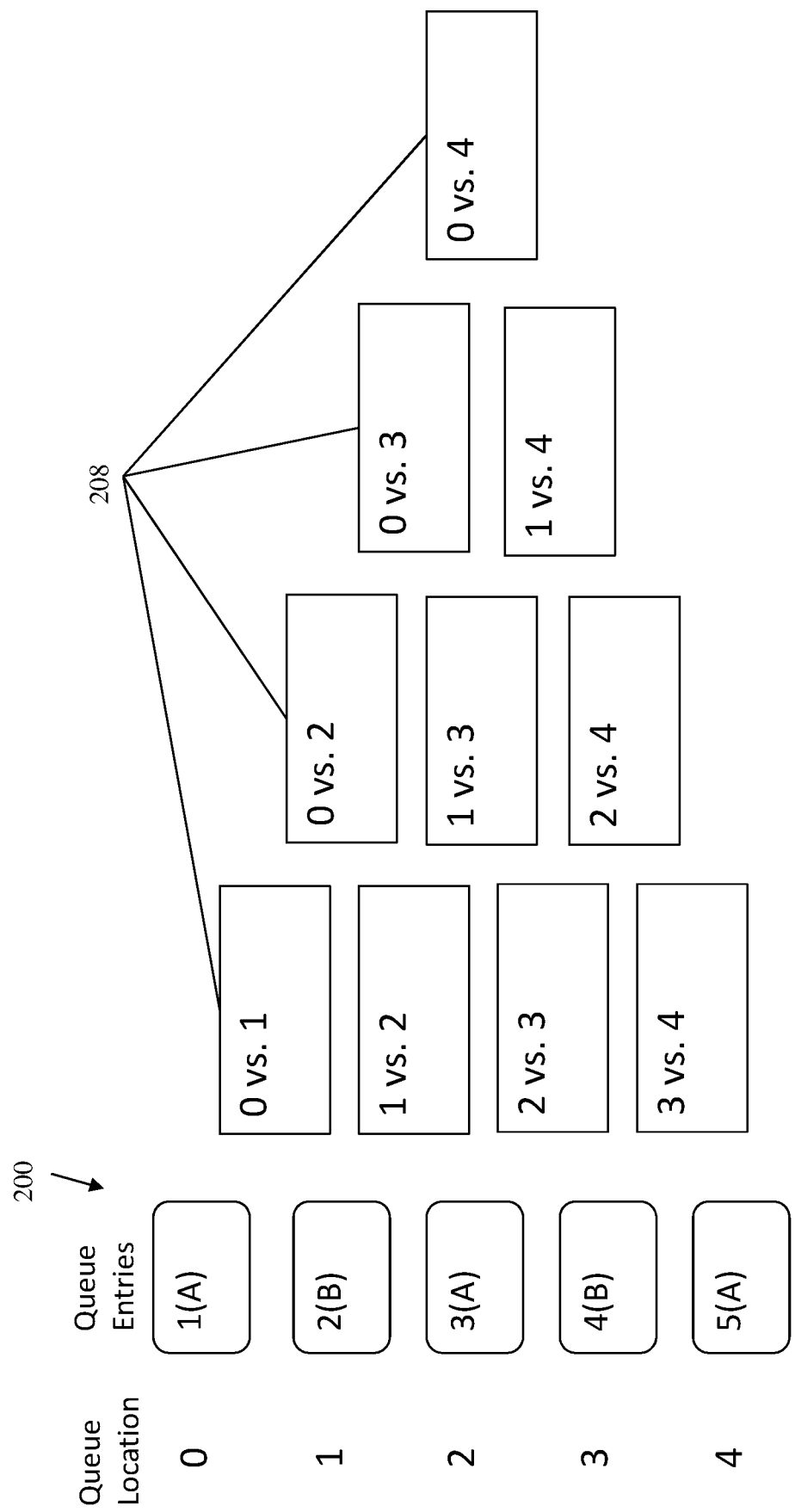
FIG. 2 depicts a block diagram of an exemplary queue with entries being managed by an LRU algorithm according to one or more embodiments of the invention.

FIG. 2 depicts a block diagram of an exemplary queue with entries being managed by an LRU algorithm according to one or more embodiments of the invention. The exemplary queue 200 includes a total of five (5) queue locations each filled with a corresponding queue entry, herein illustrated with a number and a letter in parentheses next to the number. The number represents the order in which the queue entry was written into the queue 200. For ease of illustration and explanation, the queue entries were written into the queue in an order corresponding to the queue location (i.e., 1 was written first, 2 written second, etc.). The letter represents the destination of the queue entry (e.g., target destination A and target destination B). The blocks next to the queue 200 represent state bits 208 utilize by the LRU to determine and track the relative age of each entry. In one or more embodiments, the LRU can be a state machine that utilizes multiple state bits 208. The number of queue locations determines the number of state bits 208 required to track the relative age of each queue entry. For example, a queue of size 'N' would have a total number of state bits equal to N(N−1)/2. In the illustrated example, the number of state bits 208 is 10 because the number of queue locations N is equal to 5 and 5(5−1)/2=10. In some embodiments of the invention, the LRU arbiter can utilize a state latch of each queue position with respect to each other position to track the order of the entirety of the queue entries.

Figure 3:
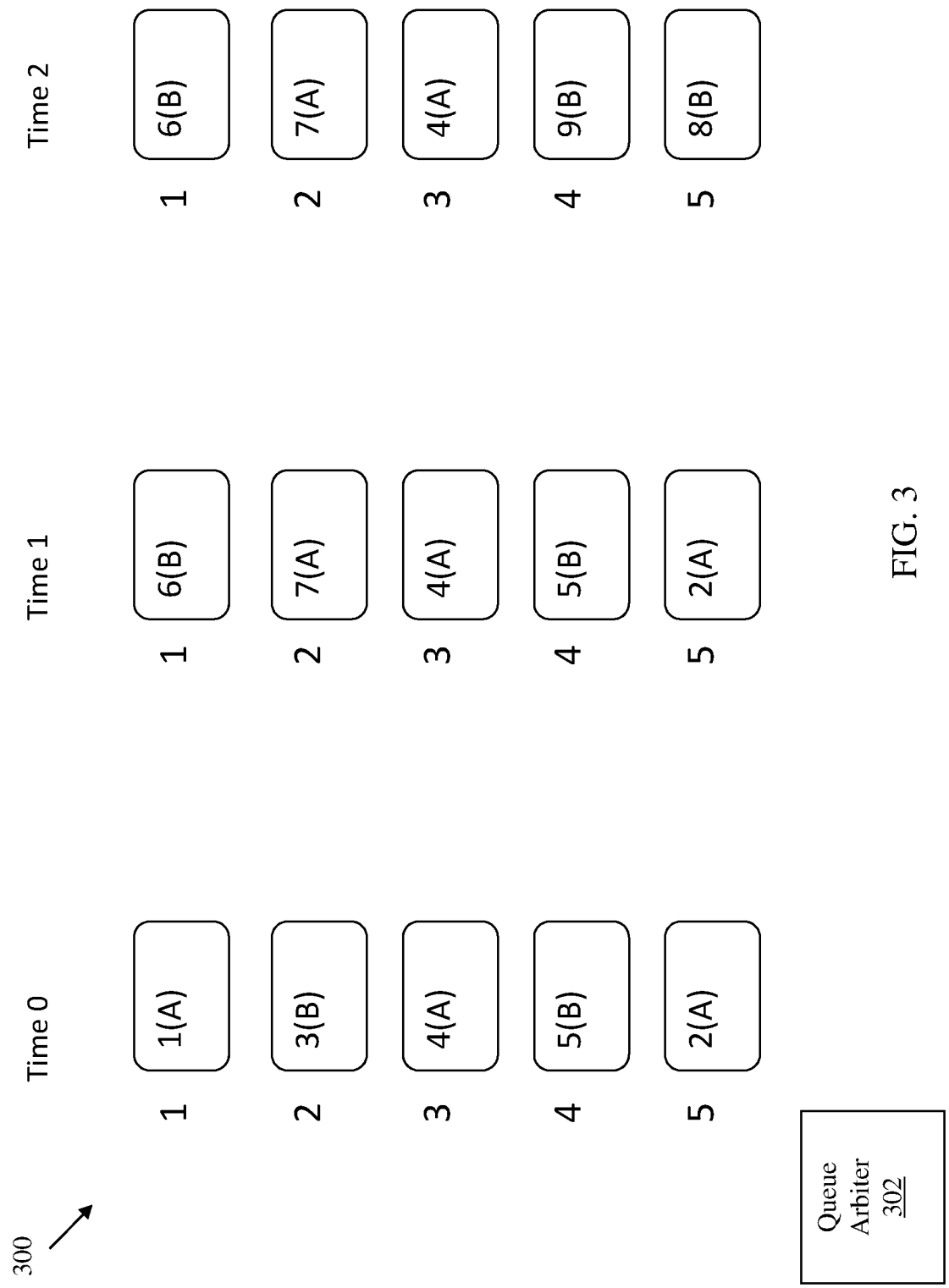
FIG. 3 depicts a block diagram of an exemplary queue with entries managed according to embodiments of the invention.

Turning now to a more detailed description of aspects of the present invention, FIG. 3 depicts a block diagram of an exemplary queue with entries managed according to embodiments of the invention. The exemplary queue 300 is shown at three different times. The queue 300 includes a total of five queue positions each including a queue entry. The queue entries have an associated number and letter for ease of illustration and description and the number and letter for each queue entry is not intended to limit the scope of each queue entry which can be any entry such as, for example, a command, data, and the like. In one or more embodiments, the queue 300 utilizes a least recently used arbiter to track the order of the entirety of the queue entries in the queue 300. The order tracking is illustrated as the number associated with the queue entry. For example, the number 3 is older than the number 5. The queue entries are further filtered by request type and destination to prioritize the queue entries separately by type, allowing each of the several receivers to receive an independently ordered stream of queue entries. In the illustrated example, the destinations are indicated by the letters in the queue entries, e.g., 'A' and 'B'. In one or more embodiments, a queue arbiter 302 can be utilized to determine what queue entries are read out of the queue. The queue arbiter 302 (sometimes referred to as an "arbitration circuit") can be implemented on the processing system 100 found in FIG. 1. In one or more embodiments of the invention, the queue arbiter 302 can determine a relative age of the queue entries, as described above, utilizing state bits for the entries. In addition, the queue arbiter 302 can determine the target destination and the entry type (e.g., command vs. data) for each queue entry. The queue arbiter 302 can determine at Time 0 the least recently used queue entry (e.g., oldest relative age) for each target destination and read these queue entries out. In the illustrated example, entry 1(A) and entry 3(B) are the least recently used entries for the two target destinations, e.g., A and B. Note that entry 2(A) has an older relative than entry 3(B); however, the LRU entries are selected by target destinations. At Time 1, the queue 300 has had entries 1(A) and 3(B) read out and new entries 6(B) and 7(A) have been written in to the queue locations (e.g., 1, 2) without any re-ordering or shifting of entries in the queue 300. At Time 1, the least recently used entries for target destinations A and B are entry 5(B) and entry 2(A) which are thus read out of the queue 300. At Time 2, new entries 9(B) and 8(B) are written in to the queue 300 at the queue locations (e.g., 4, 5) without a re-ordering or shifting. In embodiments of the invention, the queue arbiter 302 examines the least recently used queue entry by target destination and selects only the least recently used for each target destination to read out of the queue 300. This allows any queue location to hold a transaction for any destination, eliminating any need to separate transactions (i.e., queue entries) from the same sender into different queues at the time received, and allowing queue space to be used for any combination of transactions for different destinations, thus improving queue efficiency.

Figure 4:
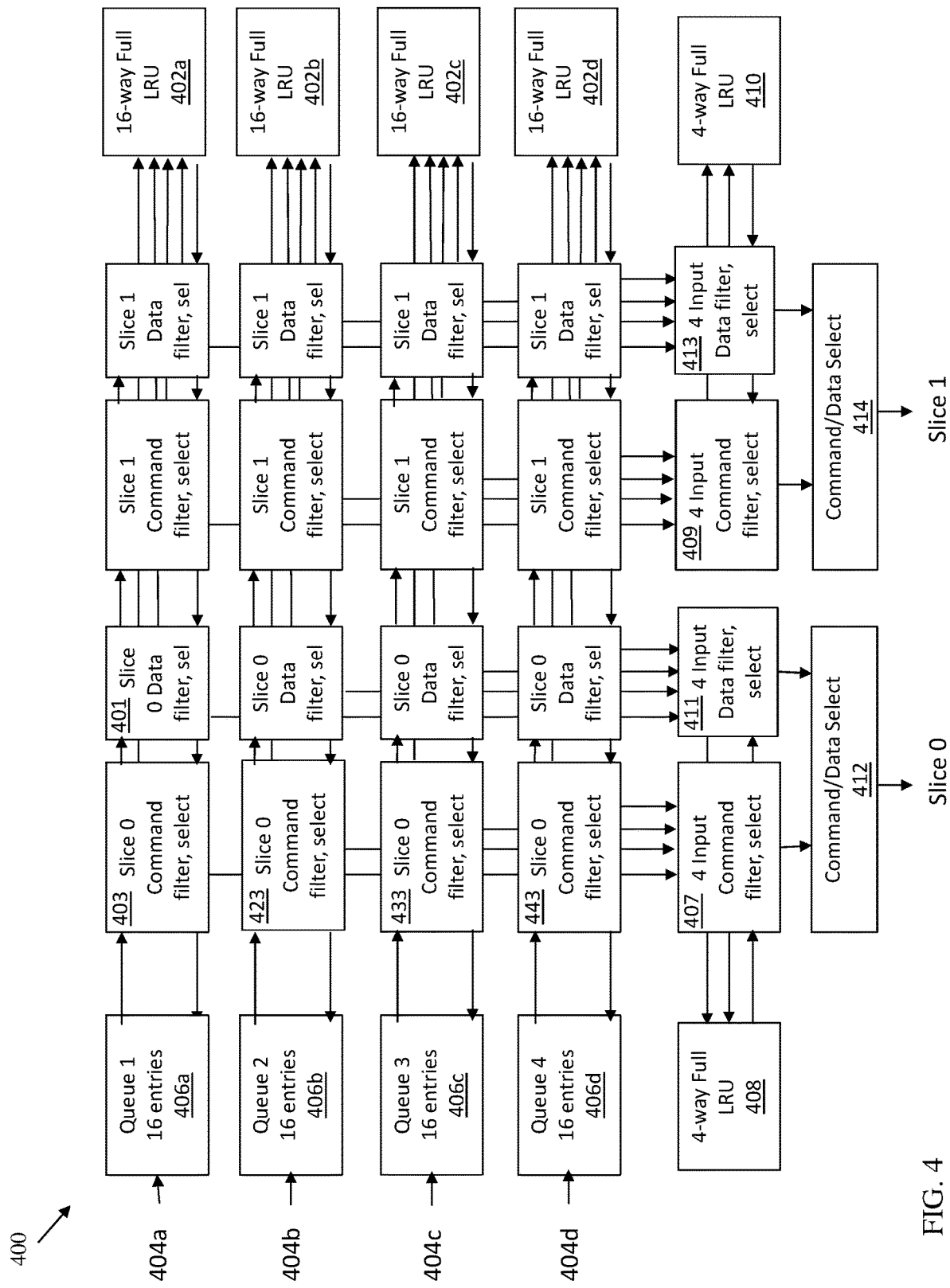
FIG. 4 depicts a system with multiple queues and multiple LRU arbiters according to one or more embodiments of the invention.
Figure 5:
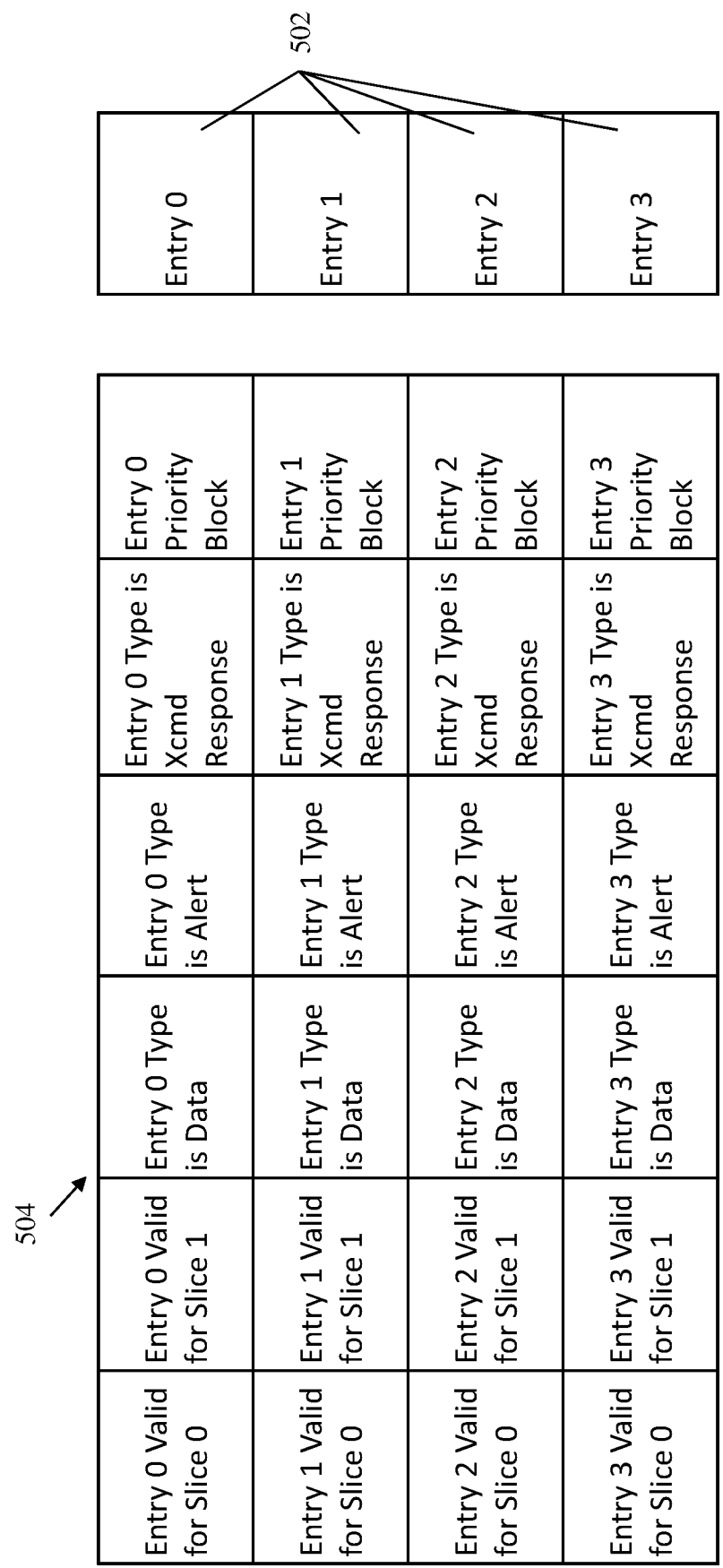
FIG. 5 depicts an exemplary queue with four entry locations according to one or more embodiments of the invention.

FIG. 4 depicts a system with multiple queues and multiple LRU arbiters according to one or more embodiments of the invention. The system 400 includes four inputs (404a, 404b, 404c, and 404d) that provide data and/or commands to four queues (406a, 406b, 406c, and 406d). The four inputs (404a, 404b, 404c, and 404d) can be any type of input including, but not limited to, input/output (I/O) commands or I/O data. In embodiments, the queues 406a, 406b, 406c, and 406d can be 16 entries queues. The queues 406a, 406b, 406c, and 406d can hold requests of two types, command request and data requests. FIG. 5 depicts an exemplary queue with four entry locations according to one or more embodiments of the invention. The queue entries 502 can include additional state bits 504 that can be utilized to identify additional conditions that may alter ordering of the queue entries in the system 400 (of FIG. 4). The four queue entries 502 are presented for illustrative and exemplary purposes and are not intended to limit the number of queue entries. In one or more embodiments of the invention, the queue entries 502 can include 16 entries, for example.

In one or more embodiments of the invention, the queues 406a, 406b, 406c, and 406d can be managed by a respective LRU arbiter 402a, 402b, 402c, and 402d. As described above the LRU arbiters 402a, 402b, 402c, and 402d can track the relative age of the entries in each of the respective queues 406a, 406b, 406c, and 406d.

Figure 6:
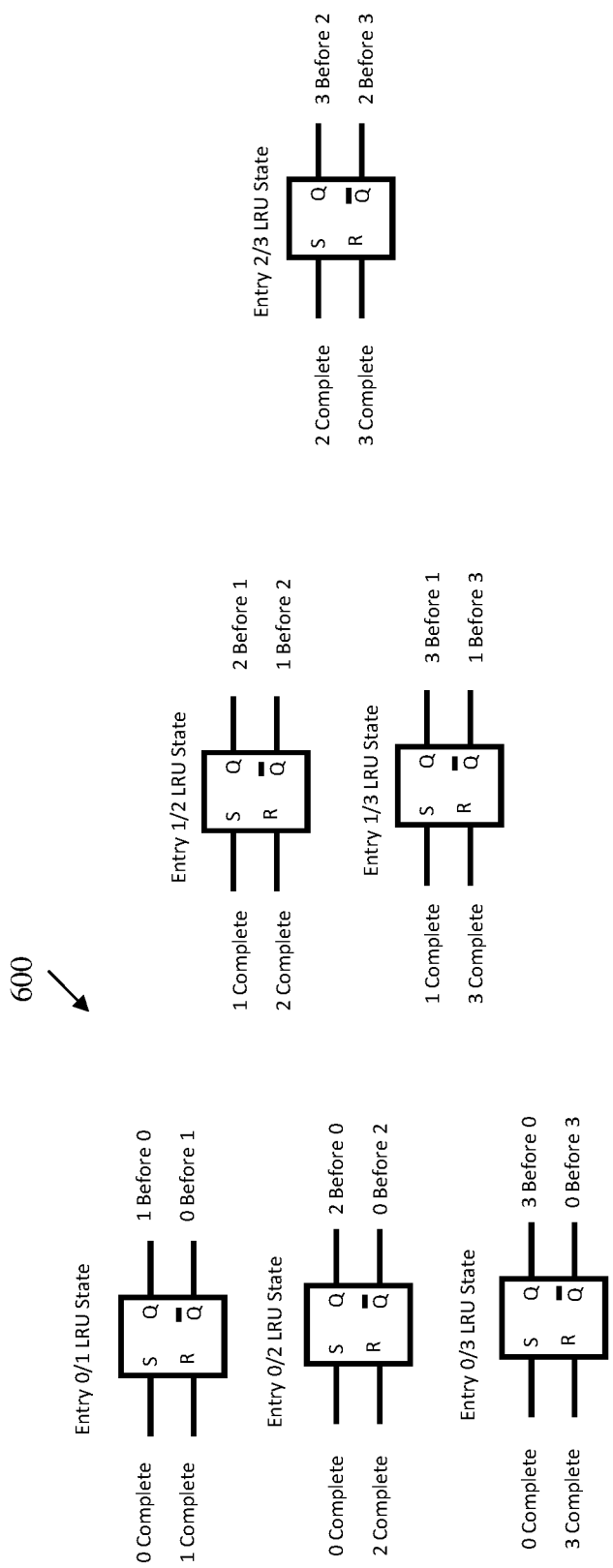
FIG. 6 depicts a block diagram of S/R LRU state latches according to one or more embodiments of the present invention.

FIG. 6 depicts a block diagram of S/R (set/reset) latches for recording LRU states according to one or more embodiments of the present invention. The S/R latches 600 illustrate how the state bits are computed for selecting the queue entries 502 (from FIG. 5). Since queue entries 502 (of FIG. 5) had 4 entries a total of N(N−1)/2 state bits are required, herein 6 state bits. The state bits can be recorded using the S/R latches 600 depicted in the illustrative example. The state bits are compared to determine the least recently used queue entry. While the illustrative example shows only six S/R latches for comparing 4 queue entries 502 (of FIG. 5), the system 400 (of FIG. 4) would require a total of 120 S/R latches for comparing 120 queue entries, e.g., (16*15)/2=120. In an alternative embodiment, a different LRU algorithm such as a binary tree LRU composed of N−1 state bits can be utilized in place of the N(N−1)/2 bit full LRU.

In one or more embodiments of the invention, the LRU arbiters 402*a*, 402*b*, 402*c*, and 402*d* can make up to four selections from each queue 406*a*, 406*b*, 406*c*, and 406*d* for reading out queue entries. The queue entries can be selected based on relative age, target destination, and command type (e.g., command or data). The filter/select blocks 401, 403 are utilized for determining what queue entries are selected in addition to the relative age as tracked by the LRU arbiters 402*a*, 402*b*, 402*c*, 402*d*. Slice 0 and Slice 1, in the illustrative example, indicate the target destination of the queue (e.g., target 0 and target 1). In some embodiments, the queues 406*a*, 406*b*, 406*c*, and 406*d* have two target destinations. A total of four combinations of selections can be made from each queue 406*a*, 406*b*, 406*c*, and 406*d* which show the range of age, destination, and command type. These selections can include LRU Slice 0 Command, LRU Slice 0 Data, LRU Slice 1 Command, and LRU Slice 1 Data. These selections can be forwarded to a next stage 407, 409, 411, and 413 which utilizes a smaller LRU arbiter 408, 410 for each target destination. The smaller LRU arbiters 408, 410 keeps track of which of the four queues the entries were sent from and select the oldest command and oldest data for the four inputs. The oldest command queue entry and the oldest data queue entry are then forwarded to the final selection (e.g., Command/Data select 412, 414). The final selection can be made by a toggle (e.g., a simple LRU, which selects least recently sent, so this has the effect of alternately sending command and data, of both are present for selection) and forwarded on to the target destination (e.g., Slice 0 or Slice 1).

Figure 7A:
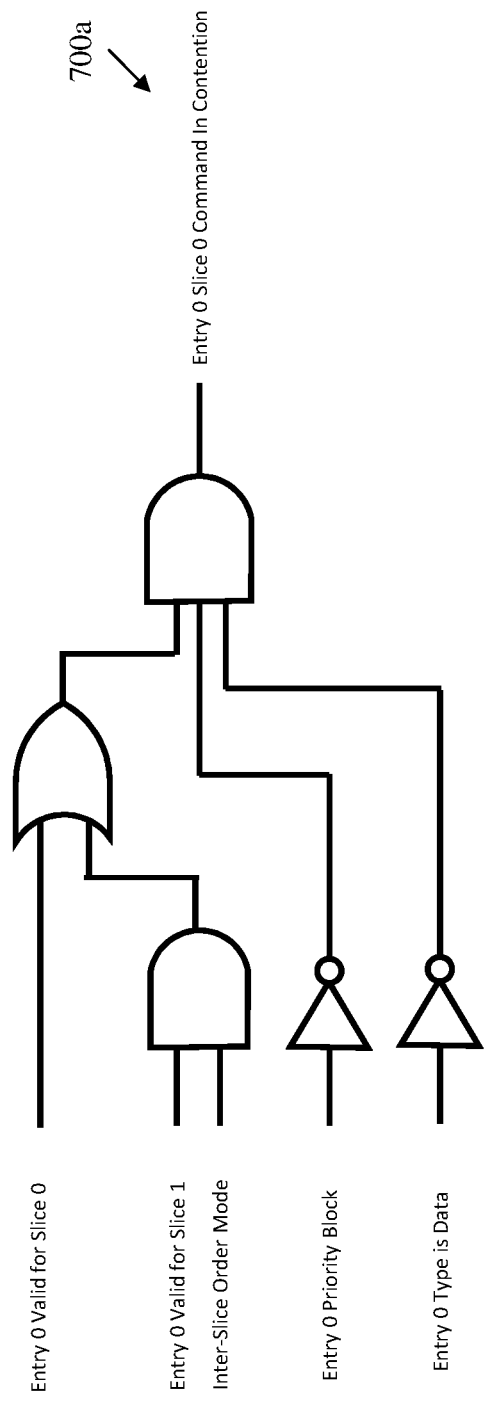
FIGS. 7a and 7b depict a circuit diagram for a command queue entry filter according to one or more embodiments of the invention.
Figure 7B:
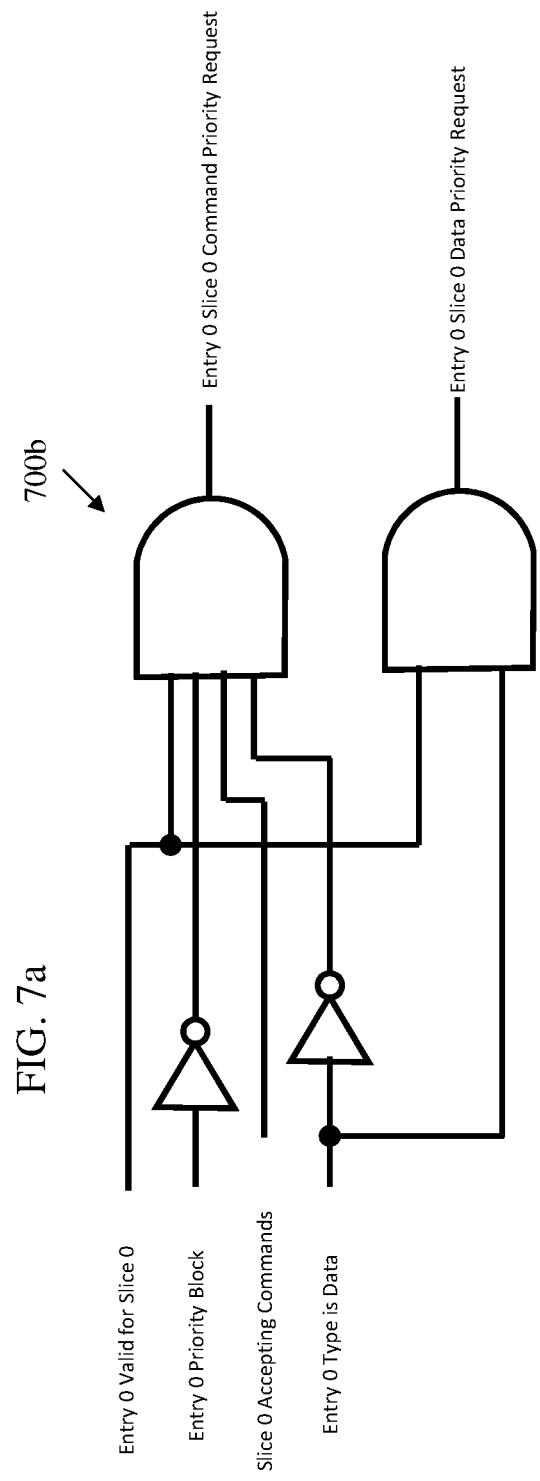

FIGS. 7*a* and 7*b* depict a circuit diagram for a command queue entry filter, filtering commands for the filter portion of filter/select 403 (of FIG. 4) and data for the filter portion of filter/select 401 (of FIG. 4) utilizing queue state bits 504 (of FIG. 5) and LRU State bits 402*a* (of FIG. 4) which are equivalent to 600 (of FIG. 6) and 208 (of FIG. 2) according to one or more embodiments of the invention. The circuit diagram 700*a* illustrates a plurality of logic elements that can be utilized for filtering and selecting a command entry from a queue entry. The circuit diagram 700*b* illustrates a plurality of logic elements that can utilized for selecting a command priority request or a data priority request. Circuit 700*a* and circuit 700*b* shows two variations of filter logic with different filtering being used for command requests and data requests. Circuit 700*a* shows how a priority block signal (e.g., the inputs labeled "Entry 0 Priority Block") can temporarily make an entry ineligible for selection. Circuit 700*a* also shows another programmable, or optional, blocking condition via the input labeled "Inter-Slice Order Mode".

Figure 8:
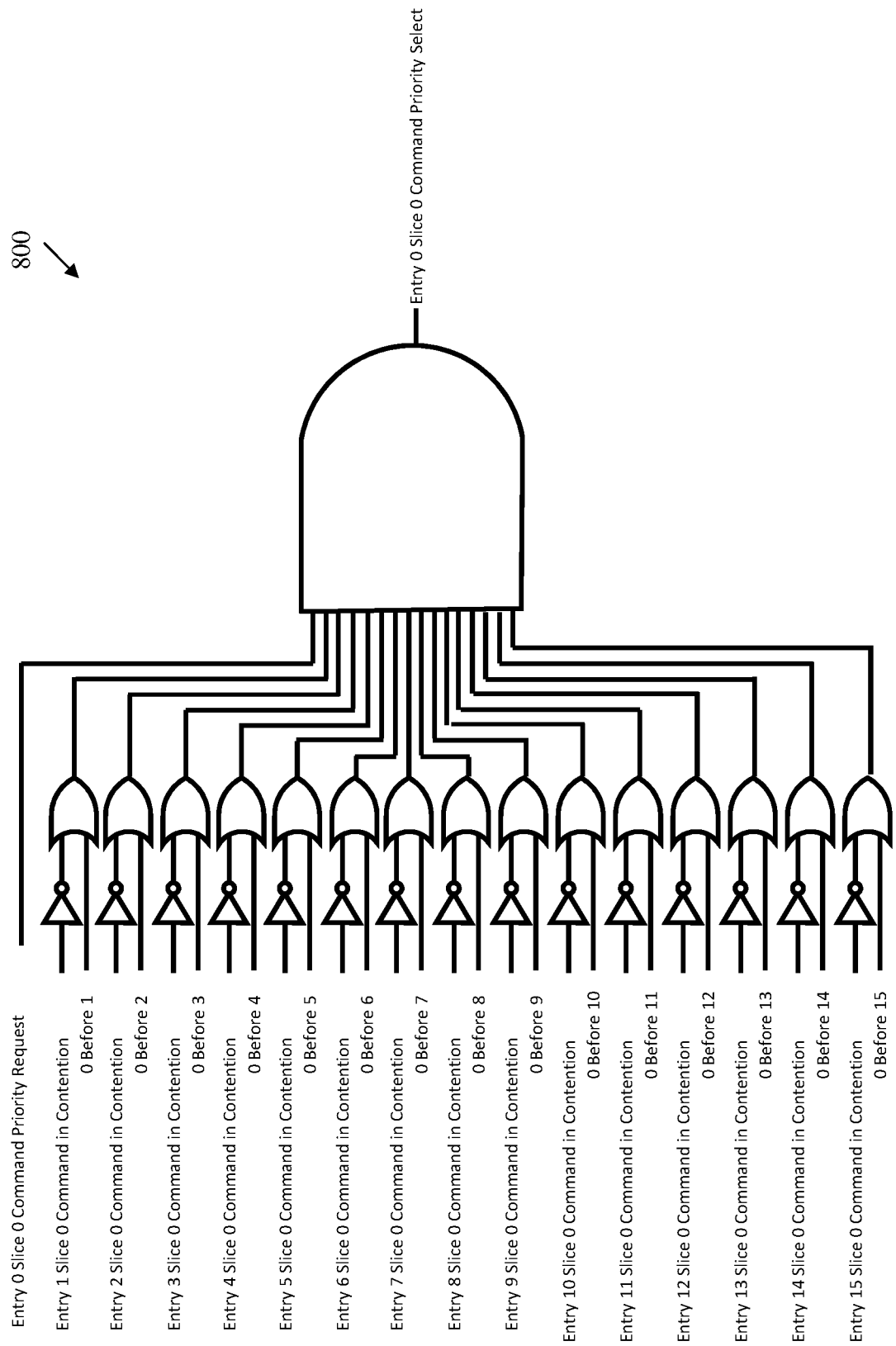
FIG. 8 depicts a circuit diagram for queue entry selection according to one or more embodiments of the invention.

FIG. 8 depicts a circuit diagram for queue entry selection (the select portion of filter/select 403 of FIG. 4) according to one or more embodiments of the invention. The circuit diagram 800 includes a plurality of logic elements that can be utilized to select queue entries from a queue. Circuit 800 utilizes the LRU State bits 600 (of FIG. 6) which are equivalent to 402*a* (of FIG. 4) and 208 (of FIG. 2) and filter results 700*a* and 700*b* (of FIG. 7) to compute a priority selection. The illustrative example shows a circuit diagram 800 for selecting command queue entries. A similar circuit diagram can be utilized for selecting data queue entries by substitution of the "Data Priority Request" signal 702*b* (from FIG. 7) in place of the "Command in Contention" and "Command Priority Request" signals 702*a* and 702*b* (from FIG. 7).

Figure 9:
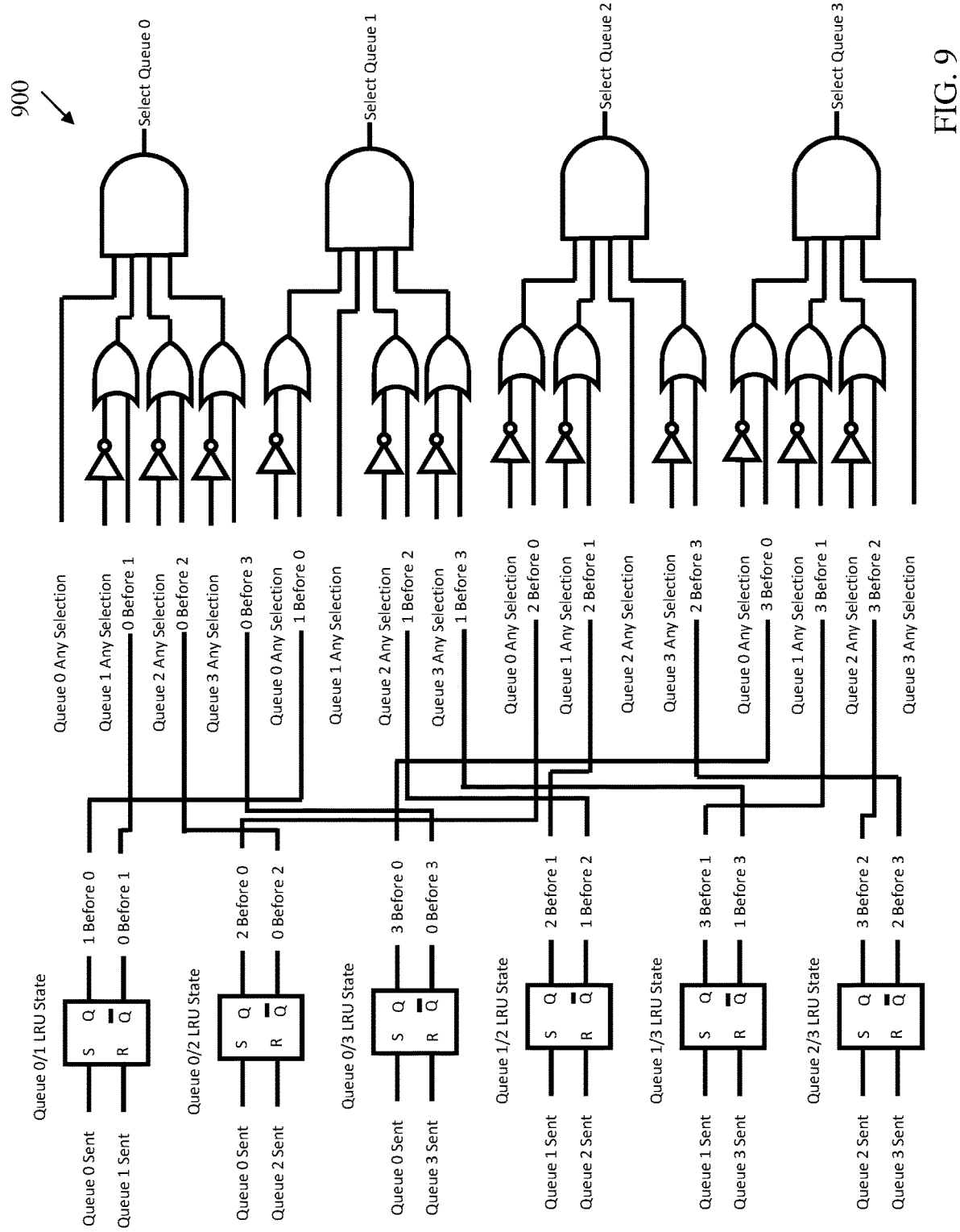
FIG. 9 depicts a circuit diagram illustrating a four-way full least recently used (LRU) with selection repeat for each target destination for both command and data queue entries according to one or more embodiments of the invention.

FIG. 9 depicts a circuit diagram illustrating a four-way full least recently used (LRU) with selection repeated in a similar manner for a second stage of priority selection for each target destination for both command and data queue entries according to one or more embodiments of the invention. The circuit diagram 900 includes a plurality of logic elements and latches for analysis of state bits to determine the least recently used queue for selection from four first stage queue arbiters (for example from 403, 423, 433, and 443 for second stage arbiter 407 of FIG. 4). Circuit 900 comprises LRU State bits 408 or 410 (of FIG. 4), and filter and selection logic 407, 409, 411, or 413 (of FIG. 4). Circuit 900 depicts all the LRU state bits 408 or 410 (of FIG. 4), and all of the selections, for one of 4 arbiters 407, 409, 411, or 413 (of FIG. 4). Herein, one set of LRU State bits for the arbiter, the LRU state bits 408 or 410 (of FIG. 4) might be separate for command 407, 409 (of FIG. 4) and data 411, 413 (of FIG. 4) arbiters, or the same LRU states 408 (of FIG. 4) may also be shared by the command 407 (of FIG. 4) and data (411 of FIG. 4) arbiters, and the same LRU states 410 (of FIG. 4) may be shared by the command 409 (of FIG. 4) and data 413 (of FIG. 4) arbiters. This arbiter serves as the second stage of priority selection 407, 409, 411, or 413 (of FIG. 4), with the purpose of providing fair and equal access to each slice output by each of the input queues 406*a*, 406*b*, 406*c*, and 406*d* (of FIG. 4). This provides an advantage that a small number of time-sensitive transactions sent to one queue from one source (for example to queue 406*a* from source 404*a* of FIG. 4) can be processed quickly, even if a large number of transactions are waiting in another queue from another source (for example in 406*b* from source 404*b* of FIG. 4).

Figure 10:
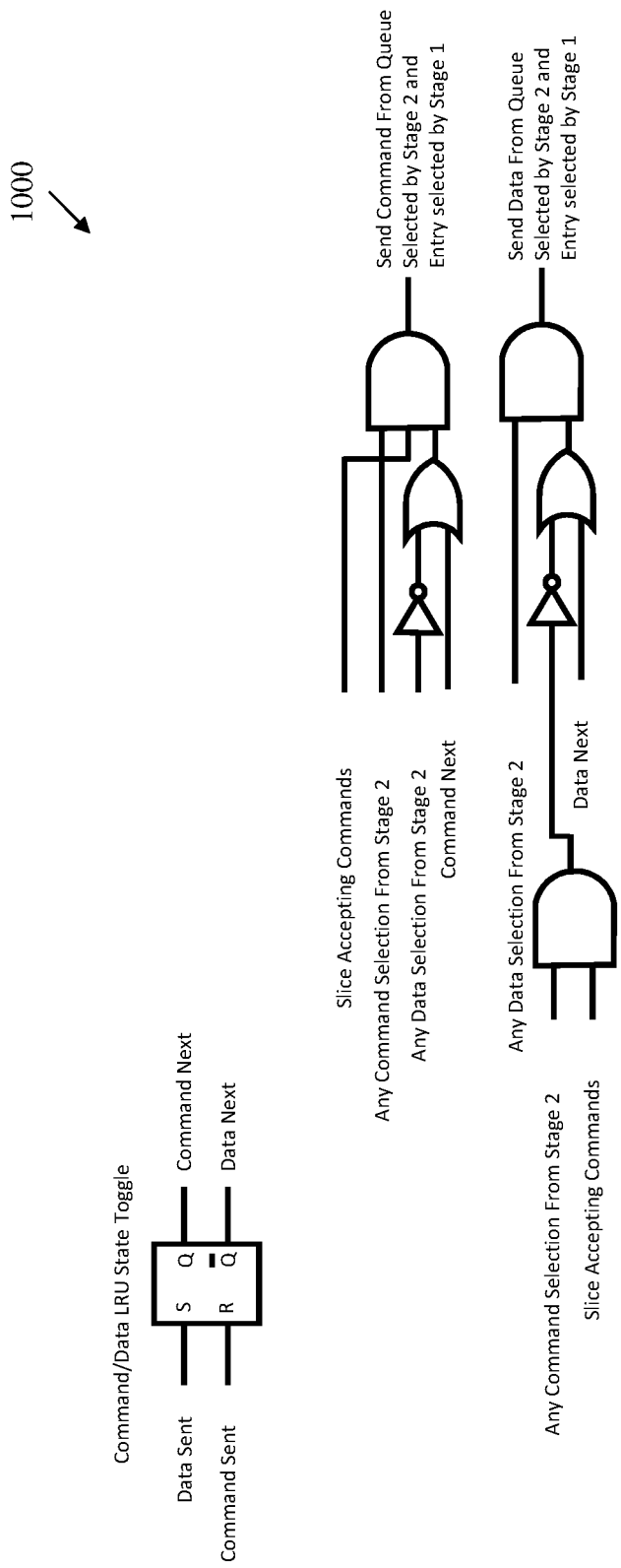
FIG. 10 depicts a circuit diagram illustrating a final priority selection stage for each target destination according to one or more embodiments of the invention.

FIG. 10 depicts a circuit diagram illustrating a final priority selection stage for each target destination according to one or more embodiments of the invention. The circuit 1000 includes a plurality of logic elements, showing in detail the selection logic of 412, 414 (of FIG. 4). At this stage, there is a final "Slice Accepting Commands" signal that causes no command to be selected if this is de-asserted (in which case, data may be selected, but commands will not). In the present embodiment there is no corresponding "Slice Accepting Data". In alternative embodiments the filtering conditions may be different, including the addition of a "Slice Accepting Data", or removal of "Slice Accepting Commands" conditions.

Figure 11:
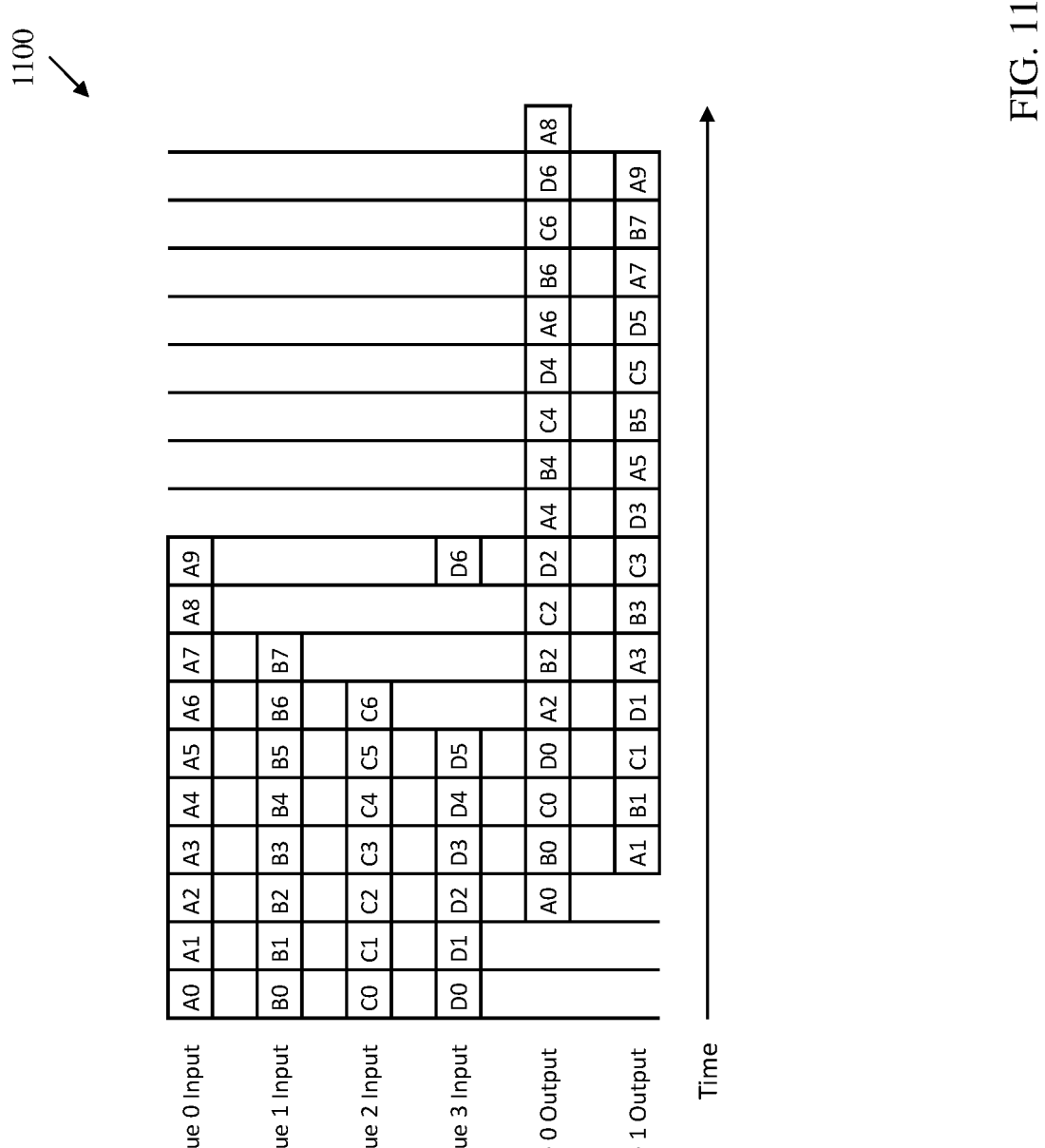
FIG. 11 depicts a timing diagram for multiple input streams into four queues feeds into two target destinations according to one or more embodiments.

FIG. 11 depicts an example timing diagram for multiple input streams into four queues feeds into two target destinations according to one or more embodiments. The timing diagram 1100 includes queue entries (Queue 0, Queue 1, Queue 2, and Queue 3) and target destination output (e.g., Slice 0 output, Slice 1 Output). The illustrative example depicts no toggling between commands and data. The timing diagram 1100 depicts how the queue arbiter with the outputs driven at maximum capacity, keeps the input streams in order per output, and provides fairness between input queues. As shown in the timing diagram 1100, the numeric suffixes of the received transactions (for example A0, A1) may illustrate an address, where even addresses go to slice 0 output and odd addresses to slice 1 output. The timing diagram 1100 assumes a 2 clock cycle minimum delay through writing queue and priority selection to read output. In the illustration the second (407, 409, 411, 413 of FIG. 4) priority stage equalizes access per input queue 406*a*, 406*b*, 406*c*, 406*d*(of FIG. 4), therefore D6 is sent before A8. Within that constraint, the first priority stage (403 of FIG. 4 for commands from Queue 1 to Slice 0) sends commands from each input queue to each output slice in the same order received, subject to certain constraints such as priority blocks that may be set to keep certain command/data types in the correct order relative to other types. In the illustration A9 is sent before A8, because order is by default maintained separately per output slice, for maximum throughput. A switchable mode ("Inter-Slice Order Mode" of FIG. 7a) is provided to maintain order across slices also. If activated, that mode would cause the slice 1 output to go idle after B7, and A9 would be sent only after A8 is sent to the other slice. The read out of A9 before A8 means the next time Queue 0 is reloaded, the entry that held A9 will be reloaded before the entry that contained A8, since the reload order will match the order the previous entries were unloaded.

Referring back to FIG. 4, technical benefits of the system 400 includes the effect that the queues 406a, 406b, 406c, and 406d are emptied in order per destination, but because each destination is considered independently (allowing different commands or data to send simultaneously to each destination) and may proceed at a different rate, the initial queue might be emptied (considering all the transfer types for all destinations) in a different order from which it was filled. This means that when the initial queue is reloaded, the next queue entries may not go into the queue in order of address in the queue (because some addresses will be still occupied, while others empty), but may be written in what may appear as "random" order. However, in fact, the same LRU bits are used to load the least recently used slot (location) in the queue, so that the queue positions are used more or less equally, and if stopped, the queue, even if emptied, will still have as many recent commands as possible, an advantage if the queue is needed to be read for debugging purposes. In embodiments, the LRU arbiters 402a, 402b, 402c, and 402d keep track of the age of queue entries by relative age, regardless of where they may be placed in the queue. This allows for speed and efficient management of the queue. For each input source, the queue that receives and writes received commands are written immediately into the queue. No extra time to examine the request and sort by type or destination is performed. Every input received is written an empty queue location, regardless of destination. In this sense, only one hardware buffer is needed for a queue. The buffer write pointer is updated in advance of anything received from an input and is always kept ready to receive. This is done by being kept always point to an empty queue location (e.g., the LRU location). In one or more embodiments, the queue can be implemented as a hardware array and new queue entries are simply written to the least recently used location in the hardware array. Because no shifting or reordering occurs, power efficiency is achieved. Physically moving the entries in the queue would require reading and rewriting the entries at a different position which costs time and array read/write power.

In one or more embodiments of the invention, the system 400 provides filtering of queue requests per sender and destination and command type with a full LRU providing simultaneous, independent first-in, first out (FIFO) queueing per sender and destination. Referring back to FIG. 5, in some embodiments, filtering can also apply by type to control order or prioritize between types (i.e., utilized to independently prioritize command and data types, and or xcmd responses vs. alert ordering, suspending alerts (a command sub-type) until xcmd responses (a data sub-type) are completed). This can be tracked by the state bits. The state bits 504 can indicate information such as, for example, a "Type is Alert," "Type is Xcmd Response," and "Priority Block." State bits associated with each queue entry 502 can be connected directly to the arbiter or may act through other logic. In the present embodiment the "Type is Alert" and "Type is Xcmd Response" state bits are not connected directly to the arbiter, they control through additional logic the "Priority Block" state bits which connect directly to the arbiter 700a and 700b (of FIG. 7). The "Type is Data" and "Entry Valid for Slice" inputs can come from the queue state bits and connect directly to the arbiter. Should a transaction type be filtered by type selection, the LRU arbiter 402a, 402b, 402c, and 402d (of FIG. 4) preserves the transaction type's original place in the queue while suspended, and when the filter is removed, the transaction resumes its prior position in the selection queue despite unfiltered requests having passed it while it was suspended (i.e., one type may need to be able to pass another type to avoid deadlocks, this allows that while preserving order within each type).

Figure 12:
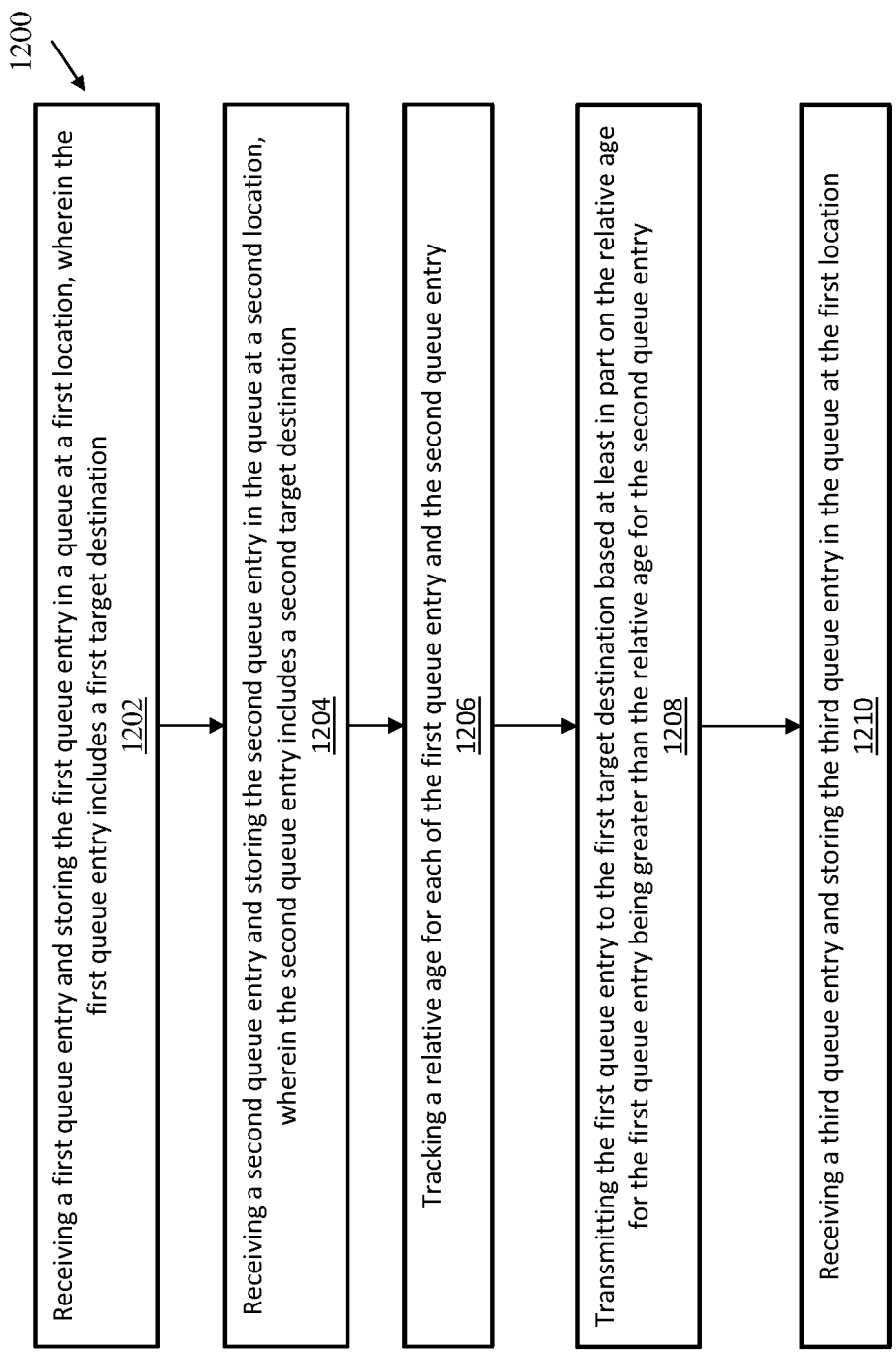
FIG. 12 depicts a flow diagram of a method for queue management according to one or more embodiments of the invention.

FIG. 12 depicts a flow diagram of a method for queue management according to one or more embodiments of the invention. The method 1200 includes receiving a first queue entry and storing the first queue entry in a queue at a first location, wherein the first queue entry includes a first target destination, as shown at block 1202. At block 1204, the method 1200 includes receiving a second queue entry and storing the second queue entry in the queue at a second location, wherein the second queue entry includes a second target destination. The method 1200, at block 1206, includes tracking a relative age for each of the first queue entry and the second queue entry. The method 1200 also includes transmitting the first queue entry to the first target destination based at least in part on the relative age for the first queue entry being greater than the relative age for the second queue entry, at block 1208. And at block 1210, the method 1200 includes receiving a third queue entry and storing the third queue entry in the queue at the first location.

Additional processes may also be included. It should be understood that the processes depicted in FIG. 5 represent illustrations, and that other processes may be added or existing processes may be removed, modified, or rearranged without departing from the scope and spirit of the present disclosure.

In one or more embodiments of the invention, the filtering algorithm (first half of filter/select) can be modified (permanently, by addition of filtering conditions, or selectable by addition of filtering conditions that can be enabled or disabled by means of a mode control signal). In embodiments, this mode control signal can be incorporated into the circuit diagram 700a or 700b (of FIG. 7a and FIG. 7b). The "Inter-Slice Order Mode" is a mode control signal. The purpose of this is to enforce a further in-order requirement on the contents of each queue. If activated, the entries for both output slices are considered together. The oldest entry (considering all entries for both output slices) will be selected and sent to the appropriate slice output, and no selection will be made to send any entry to the other output slice until such time as the oldest entry in the queue is destined for that output slice (which will occur when older entries for the other output slice have been sent). If activated, this causes the "Command in Contention" signal to include commands for both destinations (slice 0 and slice 1). Otherwise, "Command in Contention" includes only commands for one output slice. The select logic depicted in circuit 800 (of FIG. 8) makes its selection by presence of one "Command Priority Request" signal that is unaffected by this mode control signal, and by the absence of each other "Command in Contention" signal (which is modified by the mode control signal). Absence of "Command in Contention" is obtained by inverting the signal (via the inverters shown in the figure). Final selection for a queue entry is by presence of the "Command Priority Request" signal for that entry, and for each other queue entry either: The entry under consideration is before the other entry in contention (determined by the corresponding LRU state bit (e.g. "0 before 1"), or the other entry in contention is not present (the "Not" of the "Command in Contention" signal for the other entry).

The effect of the "Inter-Slice Order Mode" mode control change is to make every queue entry appear to be in contention in both the slice 0 and slice 1 arbiter, though it can only be selected at the arbiter where its priority requests signal (which is on for only one output slice regardless of the mode setting) is present. The "Type is Data" signal is another example of this filtering, in this case this used to make separate arbiters for the command entries in the queue and the data entries in the queue. In the case of this signal, no mode signal was required nor implemented, illustrating that filters may be built as invariable conditions.

By inclusion of such additional filtering conditions, the behavior of the priority selection may be altered such that variations in priority selection and ordering are obtained. "Inter-Slice Order Mode", "Type is Data", and "Priority Block" are all examples of filtering conditions that provide different priority selections from the same queue and the same LRU state bits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for queue management, the method comprising:
    receiving a first queue entry at a first time and storing the first queue entry in a queue at a first location, wherein the first queue entry includes a first target destination and a first type, wherein the first type comprises a first command;
    receiving a second queue entry at a second time and storing the second queue entry in the queue at a second location, wherein the second queue entry includes the first target destination and a second type, wherein the second type comprises first data;
    receiving a third queue entry at a third time and storing the third queue entry in the queue at a third location, wherein the third queue entry includes a second target destination and a third type, wherein the third type comprises a second command;
    tracking a relative age for each of the first queue entry, the second queue entry, and the third queue entry, wherein the first time is older than the second time, and wherein the second time is older than the third time;
    selecting, by a 4-way full LRU arbiter, the first queue entry for the first type for transmission to the first target destination based at least in part on the relative age for the first queue entry being greater than the relative age for the second queue entry and the first type being different than the second type;
    selecting the third queue entry for transmission to the second target destination prior to selecting the second queue entry for transmission to the first target destination; and
    receiving a fourth queue entry and storing the fourth queue entry in the queue at the first location.

2. The computer-implemented method of claim 1, further comprising:
    transmitting the second queue entry to the first target destination after transmitting the third queue entry to the second destination; and
    receiving a fifth queue entry and storing the fifth queue entry in the queue at the second location.

3. The computer-implemented method of claim 1, wherein a re-ordering operation for the queue is not performed upon receiving the third queue entry.

4. The computer-implemented method of claim 1, wherein the relative age for each of the first queue entry and the second queue entry is tracked by a least-recently used (LRU) algorithm.

5. The computer-implemented method of claim 1, wherein the first queue entry comprises at least one of a command and data.

6. The computer-implemented method of claim 1, wherein the relative age for each of the first queue entry and the second queue entry is tracked by a plurality of state bits associated with the first queue entry and the second queue entry.

7. The computer-implemented method of claim 1, wherein the queue comprises a storage array.

8. The computer-implemented method of claim 7, wherein the storage array comprises a write path from an input source and a read path to an output source.

9. A computer program product for queue management comprising a computer readable storage medium having program instructions embodied therewith, the program instructions executable by a processor to cause the processor to perform a method comprising:
    receiving a first queue entry at a first time and storing the first queue entry in a queue at a first location, wherein the first queue entry includes a first target destination and a first type, wherein the first type comprises a first command;
    receiving a second queue entry at a second time and storing the second queue entry in the queue at a second location, wherein the second queue entry includes the first target destination and a second type, wherein the second type comprises first data;
    receiving a third queue entry at a third time and storing the third queue entry in the queue at a third location, wherein the third queue entry includes a second target destination and a third type, wherein the third type comprises a second command;
    tracking a relative age for each of the first queue entry, the second queue entry, and the third queue entry, wherein the first time is older than the second time, and wherein the second time is older than the third time;
    selecting, by a 4-way full LRU arbiter, the first queue entry for the first type for transmission to the first target destination based at least in part on the relative age for the first queue entry being greater than the relative age for the second queue entry and the first type being different than the second type;
    selecting the third queue entry for transmission to the second target destination prior to selecting the second queue entry for transmission to the first target destination; and
    receiving a fourth queue entry and storing the fourth queue entry in the queue at the first location.

10. The computer program product of claim 9, further comprising:
    transmitting the second queue entry to the first target destination after transmitting the third queue entry to the second destination; and receiving a fifth queue entry and storing the fifth queue entry in the queue at the second location.

11. The computer program product of claim 9, wherein a re-ordering operation for the queue is not performed upon receiving the third queue entry.

12. The computer program product of claim 9, wherein the relative age for each of the first queue entry and the second queue entry is tracked by a least-recently used (LRU) algorithm.

13. The computer program product of claim 9, wherein the first queue entry comprises at least one of a command and data.

14. The computer program product of claim 9, wherein the relative age for each of the first queue entry and the second queue entry is tracked by a plurality of state bits associated with the first queue entry and the second queue entry.

15. The computer program product of claim 9, wherein the queue comprises a storage array.

16. The computer program product of claim 15, wherein the storage array comprises a write path from an input source and a read path to an output source.

* * * * *